June 16, 1931. J. A. STUECKLE 1,810,191
NONSKID TIRE CHAIN
Filed March 28, 1930
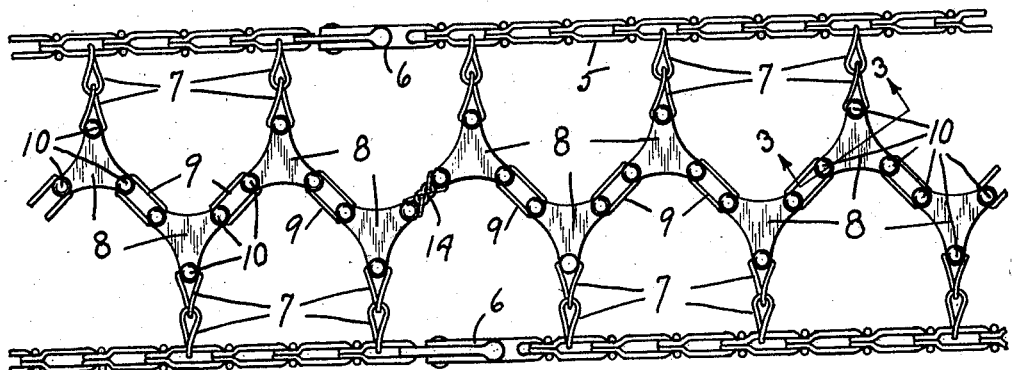
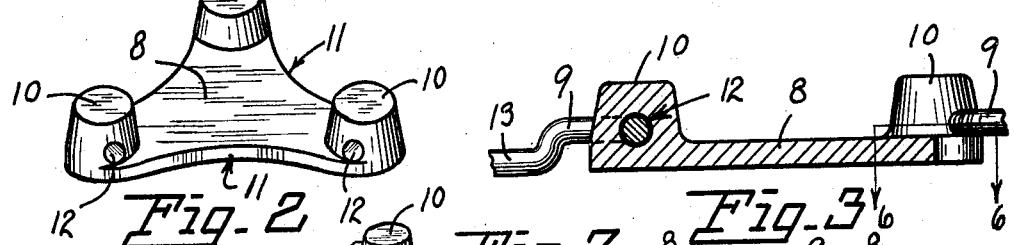
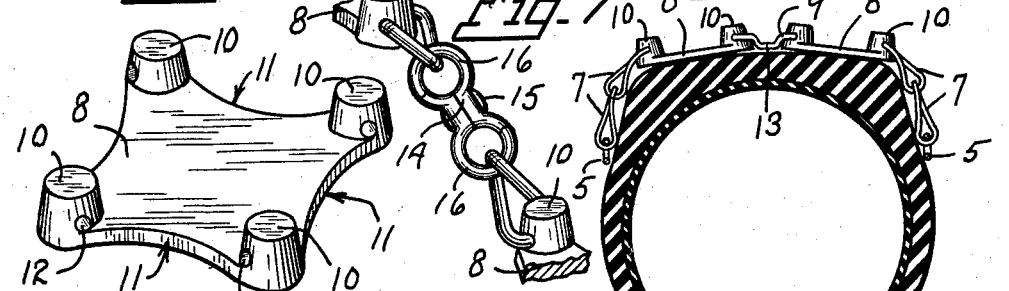
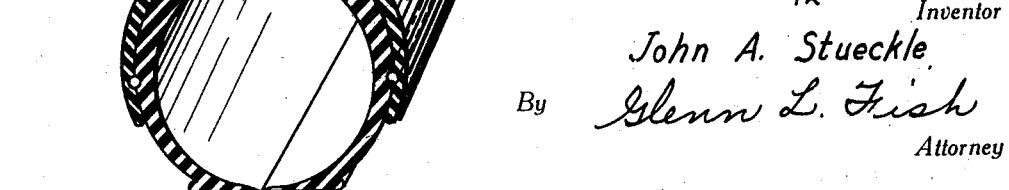
Inventor
John A. Stueckle
By Glenn L. Fish
Attorney Patented June 16, 1931

1,810,191

UNITED STATES PATENT OFFICE

JOHN A. STUECKLE, OF SPOKANE, WASHINGTON

NONSKID TIRE CHAIN

Application filed March 28, 1930. Serial No. 439,639.

My invention relates to non-skid tire chains and one object of the invention is to provide a tire chain comprising a series of linked together plates having a traction calk or element disposed at each corner thereof whereby the several calks of each plate serve as a unit in cooperatively engaging the ground. Another object is to connect the several plates together by links through the calks at the corners above the plates thus creating a leverage whereby the plates are held in close engagement with the tread of a tire and providing strong connections between the plates. A further object is to provide the connecting links with offset or depressed middle portions that are flush with the bottoms of the plates whereby a continuous surface engagement between the chain as a whole and the tire tread is accomplished. Still further objects are to provide concave edges for the plates, to provide a novel pivoted split link for the connection between the traction plates, and to provide a semi-tubular tire casing member having the chain vulcanized thereinto with its traction calks projecting exteriorly thereof.

With the above and other objects in view which will appear as the description proceeds, the invention consists of the novel construction, adaptation, combination and arrangement of parts hereinafter described and claimed. These objects are accomplished by devices illustrated in the accompanying drawings; wherein:—

Figure 1 is a plan view showing a portion of a tire chain embodying my improved non-skid means;

Fig. 2 is a detail view in perspective showing a triangular plate with a traction calk at each of its corners;

Fig. 3 is a view in vertical section taken substantially on a broken line 3, 3 of Fig. 1;

Fig. 4 is a detail view in perspective showing a rectangular or square plate having a calk at each of its corners;

Fig. 5 is a view in transverse section of a tire showing a section of my non-skid chain installed on the tread thereof;

Fig. 6 is a detail view in horizontal section through one of the calks taken on a broken line 6, 6 of Fig. 3 and showing the connection of a link therewith;

Fig. 7 is a view in perspective showing a locking means for the link connection between two plates;

Fig. 8 is a detail view in perspective showing a modified form of traction calk; and Fig. 9 is a view in perspective of a tire section having an extra semi-tubular casing installed thereon with my non-skid chain vulcanized into the casing and its calks projecting therethrough.

Referring to the drawings throughout which like reference numerals indicate like parts, the numeral 5 designates a pair of spaced side chains each of which is locked together at 6. Short link connections 7 extend transversely from the side chains to traction plates or elements 8 and said plates are connected to each other by links 9.

The plates 8 are provided with a traction calk or element 10 at each of their corners and it will be understood that said plates may be triangular in shape as shown in Fig. 2, rectangular or square as shown in Fig. 4, or of any other desirable and suitable shape. Regardless of the shape of said plates it is essential that the calks be disposed at each corner thereof as this is one of the prime features of my invention. The square form of plate shown in Fig. 4 is particularly adapted for three rows of plates instead of the two rows shown in Fig. 1.

By placing the calks or elements 10 at each corner of the plates 8 each plate serves as a unit in itself in providing an equalized and balanced tractional engagement of the calks with the ground and a maximum efficiency in such engagement. Referring to Figs. 2 and 4, the side edge portions of the plates are preferably concave to a slight extent as at 11. This provides some flexibility for the corner portions of the plates, which plates may be made of resilient metal such as spring steel or the like, and allows the calks to individually engage the ground in uneven spots as will be understood.

The traction calks or elements 10 are preferably, though not necessarily, an integral part of the plates 8 and of a truncated conical shape. A very important feature of my invention is to make the connection of the links 7 and 9 through the calks and slightly offset from the outer surface of the plates. This means of connection provides an equalized and concentric pull on the plates by the connecting links through the calks at each corner, and by reason of the link connection being offset from the plates also provides some leverage whereby the bottoms of the plates are drawn into snugger engagement with the tire tread. As shown in Fig. 6, the links are connected through holes 12 that may be drilled or drop-forged through the calks and reamed or rounded to the shape shown whereby flexibility of movement between the plates and links is provided for.

Another important feature of the invention is the provision of an offset or depressed portion 13 for the links 9 as most clearly shown in Figs. 3 and 5 of the drawings. The middle portions of said links are offset or depressed sufficiently to make them substantially flush with the underside or bottom surface of the plates 8. In providing this depression the undersides of said plates and links form a continuous engagement with the tire tread thus providing means whereby frictional wear of the tire tread by the chain is diminished.

In Fig. 8 of the drawings a modified form of calk is provided by rolling the corner portions of the plates 8 over upon themselves which also provides a hole for the connecting links 7 and 9. In Fig. 7 a novel securing or locking means is provided for the connecting links. Said means comprises a figure-8 link 14 composed of composed of complementary halves that, when placed together and pivotally connected by a pin 15, form split rings or loops 16 at either end. Said halves may therefore be pivotally opened and the connecting links inserted into said split rings which links will retain said halves in the closed or locked position as will be understood. Referring to Fig. 9 of the drawings, the entire chain is vulcanized into a semi-tubular casing 17 with the calks 10 projecting exteriorly thereof and said casing, when installed on a tire, may be secured thereto by any desired means.

It will now be apparent that I have provided a tire chain that is high in traction efficiency and non-skid ability, which is adapted to fit a tire tread smoothly and snugly thus preventing frictional wear of the tire, and which is simple, economical and very durable in construction. Having thus described my invention, it being understood that minor changes may be resorted to in its construction and arrangement without departing from the scope and spirit of the invention, what I claim and desire to secure by Letters Patent of the United States is:—

1. A non-skid tire chain having in combination a series of triangular plates, traction calks for the corners of the plates, links for the plates disposed through the calks at points offset from the plates, and depressed middle portions for the links disposed flush with the lower or tire engaging surface of the plates.

2. A non-skid tire chain having in combination a plurality of triangular plates, said plates disposed in zig-zag arrangement with a side of each plate parallel with a side of the other plates, a traction calk on each corner of the plates, links connecting the plates disposed through the calks of adjacent plates at points offset from the plates, side chains for the plates, and links connecting the third corners of each adjoining plate with the side chains normal thereto and disposed in alternate counter directions from the plates.

In testimony whereof I affix my signature.

JOHN A. STUECKLE.